United States Patent
Schwarz et al.

(10) Patent No.: US 7,331,635 B2
(45) Date of Patent: Feb. 19, 2008

(54) SEAT PART FOR A VEHICLE SEAT

(75) Inventors: Tobias Schwarz, Budenheim (DE); Frederic Meyer, Bad Nenndorf (DE); Andre Dohm, Auetal (DE); Ulrich Riegler, Lindhorst (DE); Titus Falbesaner, Stadthagen (DE)

(73) Assignee: Faurecia Autositze GmbH (DE)

( * ) Notice: Subject to any disclaimer, the term of this patent is extended or adjusted under 35 U.S.C. 154(b) by 40 days.

(21) Appl. No.: 10/964,906

(22) Filed: Oct. 14, 2004

(65) Prior Publication Data

US 2005/0077774 A1    Apr. 14, 2005

(30) Foreign Application Priority Data

Oct. 14, 2003    (DE) ................. 103 47 550

(51) Int. Cl.
*A47C 7/02*    (2006.01)
(52) U.S. Cl. ............... 297/452.18; 297/217.3; 297/180.11
(58) Field of Classification Search ........... 297/452.18, 297/217.3, 452.12, 452.22, 452.55, 452.24, 297/180.11, 180.12; 340/665, 666, 667; 174/72 A; 439/502
See application file for complete search history.

(56) References Cited

U.S. PATENT DOCUMENTS

| 4,002,108 | A | * | 1/1977 | Drori ................. 454/120 |
|---|---|---|---|---|
| 4,869,550 | A | * | 9/1989 | Lorenzen et al. ...... 297/180.12 |
| 5,442,518 | A | * | 8/1995 | Beam .................. 361/690 |
| 5,626,386 | A | * | 5/1997 | Lush ................ 297/180.13 |
| 5,857,749 | A | * | 1/1999 | DeBellis et al. ...... 297/452.41 |
| 6,106,057 | A | * | 8/2000 | Lee .................. 297/180.14 |
| 6,120,327 | A | * | 9/2000 | O'Brien et al. ........... 439/623 |
| 6,179,378 | B1 | * | 1/2001 | Baumgartner et al. . 297/180.12 |
| 6,371,552 | B1 | * | 4/2002 | Narita et al. ......... 297/180.12 |
| 6,994,401 | B1 | * | 2/2006 | Fischer et al. ........ 297/452.14 |
| 2002/0050730 | A1 | * | 5/2002 | Kondo et al. ........... 297/217.3 |
| 2002/0129962 | A1 | * | 9/2002 | Doshita et al. .......... 174/72 A |

FOREIGN PATENT DOCUMENTS

| DE | 100 80 343 T1 | 7/2000 |
|---|---|---|
| DE | 101 25 175 A1 | 11/2002 |
| DE | 101 50 533 A1 | 11/2002 |

OTHER PUBLICATIONS

English Abstract of DE 101 25 175—1 page.

* cited by examiner

*Primary Examiner*—Laurie K. Cranmer
(74) *Attorney, Agent, or Firm*—Synnestvedt & Lechner LLP

(57) ABSTRACT

The invention relates to a seat part for a vehicle seat, in particular a motor vehicle seat, having a seat pan (1) made of sheet metal, a seat cushion applied to the seat pan (1) and a cable assembly (17) running in the seat cushion.

In order to make possible simple and economical installation of the cable assembly and manufacture of the seat part, the invention provides that the seat pan (1) is formed as a deep-drawn part and channels (8, 11, 12) are formed in the seat part (1), in which the cable assembly (17) is accommodated.

9 Claims, 2 Drawing Sheets

SEAT PART FOR A VEHICLE SEAT

CROSS REFERENCE TO RELATED APPLICATIONS

This application claims the priority of German Patent Application 103 47 550.8 filed on Oct. 14, 2003, the entire contents of which is hereby incorporated in total by reference.

BACKGROUND OF THE INVENTION

1. Field of the Invention.

The invention relates to a seat part for a vehicle, in particular a motor vehicle seat.

2. Description of Related Art

Motor vehicle seats are being increasingly equipped with different electrically operated functional groups; for example, sensors, adjusting and comfort devices. Thus, motor-operated adjusting devices for seat height, seat length adjustment and recliner inclination are already common even in lower-price range vehicles. In addition, at times, heating devices, pyrotechnical safety devices, seat occupancy detection systems and electrical motors; for example for damping of vibrations and massage devices are provided, for wiring expenditure for connecting the function groups to the power supply and control electronics of the on-board power system increasingly augments. In this case the cables are generally laid in the seat part and, if need be, in the back support.

A safe laying of the cable harness is in general associated with a substantial installation expenditure in this case, the cable assembly can thus be affixed in conventional fashion using clips, for example, or receiving bracket, this type of assembly is, however, expensive; in addition the sometimes acutely terminating clips and cable clamps obstruct and at times damage other function groups.

The object of the invention is to provide improvements vis-à-vis the prior art and, in particular, a simple and economical installation of the cable clamp and making possible simple and economical manufacture of the seat part.

This object is achieved by a seat part. The dependent claims describe preferred embodiments.

SUMMARY OF THE INVENTION

According to the invention, the seat pan is accordingly manufactured out of sheet metal as a deep-draw part, in which channels for receiving the cable assembly are formed. The channels are formed during the same deep-draw stroke, wherein the seat pan is formed with a middle zone, side walls and back zone, so that no additional costs for formation of the channels is incurred. In this fashion, the channels increase the rigidity of the deep-drawn part, wherefore they can be formed in particular with rectangular or trapezoidal cross-section. Through the stiffer formation, the seat pan can be designed with low weight. Function groups are adapted, so that the cables and connected plugs can be arranged precisely as to position and the cabling outside of the channels remains minimal. In this connection, the channels advantageously extend directly up to the edges of the sheet metal part or transition to flattenings. At the less stressed, raised rear zone of the seat pan, the channels can also extend also flat.

Accordingly, a simple, economical and lighter-weight manufacture of the seat pan is possible. In virtue of the channels, a safe, rapid accommodation of the cable assembly is achieved without additional tools or resources and without a disturbing affect of the cable assembly on the cushion arranged above.

The invention will be more completely described with the aid of the enclosed drawings with reference to an exemplary embodiment. Wherein:

DETAILED DESCRIPTION OF THE INVENTION

Figure 1:
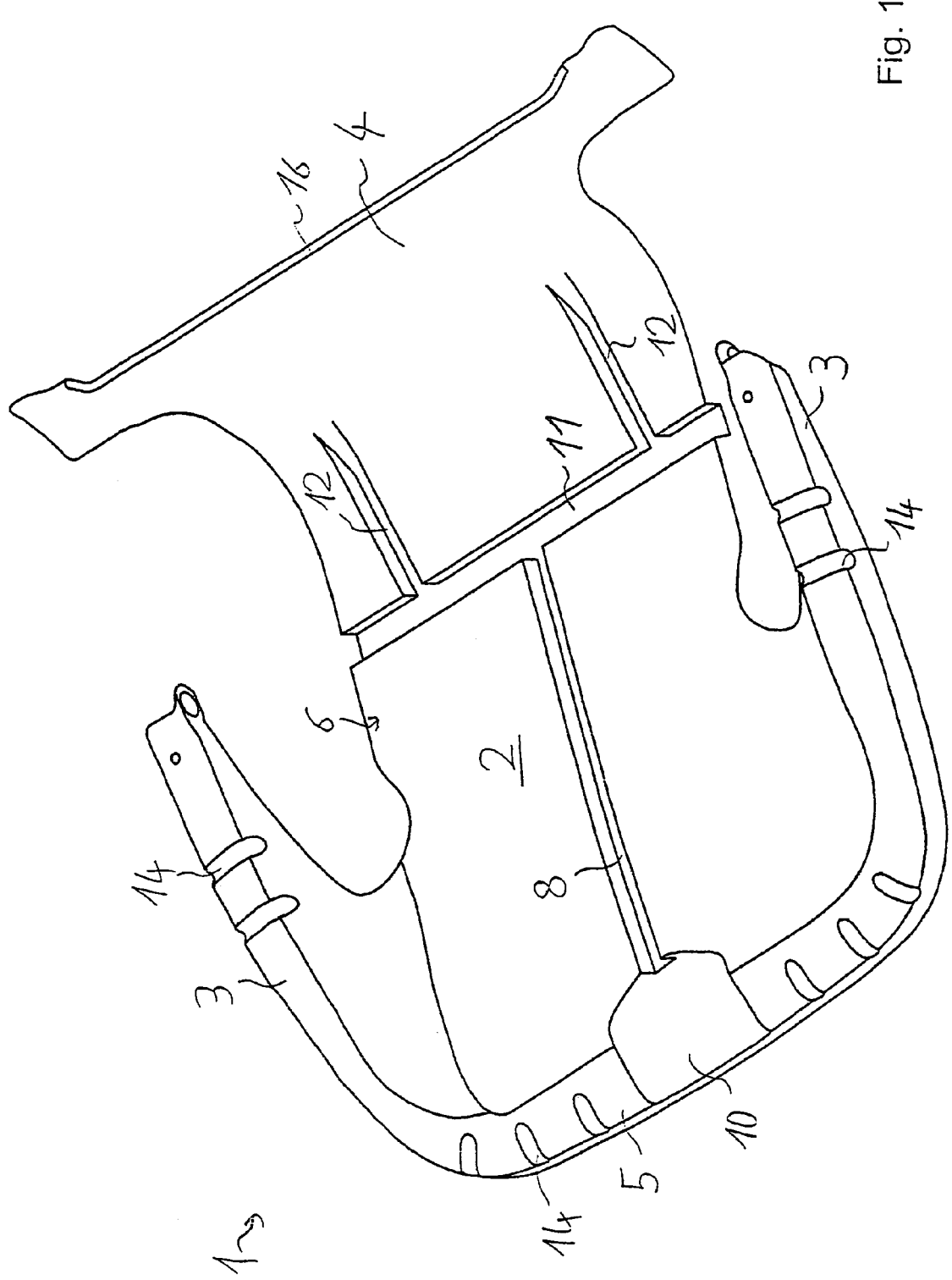
FIG. 1 a perspective view of a seat pan of a seat part according to the invention.

During the course of this description, like numbers will be used to identify like elements according to the different views that illustrate the invention.

A seat pan 1 is formed from sheet metal as a deep-drawn part having a middle zone 2, side walls 3 extending from same, projecting upwards, a raised rear zone 4 and a front zone 5 inclining forwards.

A longitudinal channel 8 extends longitudinally through the middle zone, said longitudinal channel 8 transitions at its leading end into a flattening 10 extending over the front zone 5. At its rear end the longitudinal channel 8 transitioned into a transverse channel 11, from which two additional longitudinal channel 12, diverge rearwards, laterally offset.

All channels 8, 11, 12 are formed advantageously having rectangular cross-section on the upper side 6, whereby the floor of the channel of the rear longitudinal channels 12 rise at their rear ends, so that the rear longitudinal channels taper off at the rising rear zone 4 of the seat pan 1.

Channels 8, 11, 12 and the flat portion 10 effect a stiffening of the seat pan 1; in complement corrugations 14 are formed in the side walls 3 and the front zone 5 as reinforcements In addition, a rear edge 16 and, if need be, additional edges can be applied for stiffening for protecting the seat cushion arranged on the seat pan 2.

Figure 2:
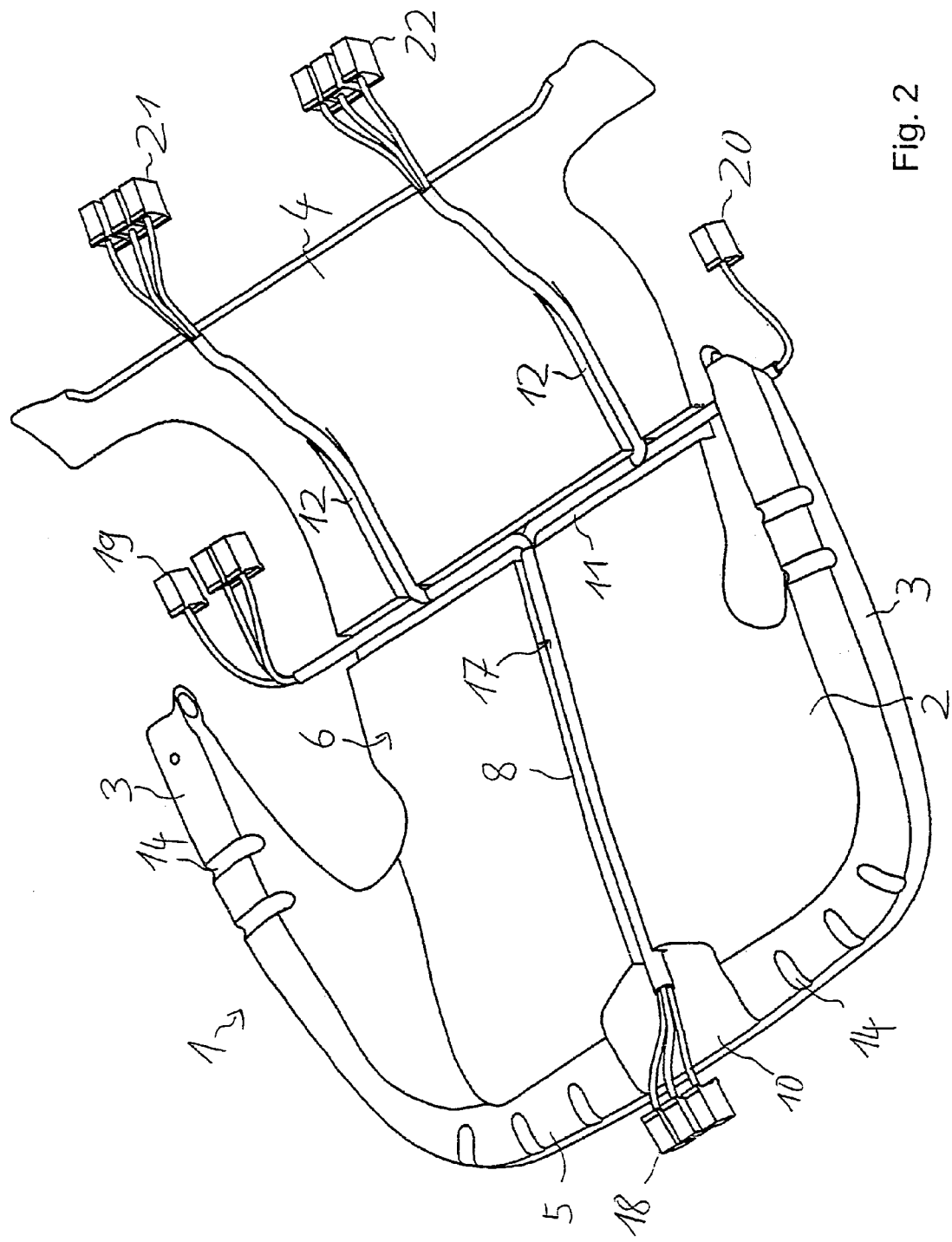
FIG. 2 the seat pan of FIG. 1 with an installed cable assembly.

FIG. 2 represents a cable assembly 17 laid in the channels 8, 11, 12, wherein the individual cables of the cable assembly 17 have run through the longitudinal channels 8, 12 and the transverse channel and have plugs 18, 19, 20, 21, 22 at their ends for the function groups provided on the seat pan, preferably in the seat cushion. In this case, for example, at least three plugs 18 are provided for adjustment of a seat part, presence sensor mat, and heating mat, at least three plugs 19 for connecting of the pyrotechnics, seat forward and rearward inclination adjustment and an anti-submarining bar as well as a plurality of plugs 21, 22, 23, three strikers 21 and three plugs 22, for example, for connecting the heating mat, back inclination adjustment, head-rest height adjustment, head-rest inclination adjustment, lumbar support, side airbag, etc., as well as a plug 20 for seat length adjustment. Accordingly, the cables for control and power connections can be also be laid for additional function groups of the vehicle seat in the channels 8, 11, 12.

While the invention has been described with reference to the preferred embodiment thereof, it will be appreciated by those of ordinary skill in the art that modifications can be made to the parts that comprise the invention without departing from the spirit and scope thereof.

The invention claimed is:

1. A seat part for a vehicle seat for motor vehicle seats, comprising:
   a seat pan (1) made of a formed sheet of metal, the seat pan having a plurality of channels, and being capable of accepting a seat cushion arranged on the seat pan, and the plurality of channels being arranged such that at least one of the channels transitions into at least three other of the channels; and
   a cable assembly accommodated in the plurality of channels.

2. The seat part according to claim 1 wherein the channels (8, 11, 12) are formed on the top of the seat pan (1).

3. The seat part according to claim 1, wherein the channels (8, 11, 12) have a cross-section that is a rectangular cross-section or a trapezoidal cross-section.

4. The seat pan according to claim 1, wherein the seat pan (1) is formed in a single deep-draw process with a middle zone (2), side walls (3), a rear zone (4) and the channels (8, 11, 12).

5. The seat pan according to claim 1, wherein the seat pan (1) has at least one longitudinal channel (8) extending up to a front zone (5) and a transverse channel (11) extending transversely over the seat pan (1).

6. The seat part according to claim 5, wherein the longitudinal channel (8) continues at its front end into a flat portion (10) extending over a front zone (5) of the seat pan (1).

7. The seat part according to claim 5, wherein the seat pan (1) comprises at least one rear longitudinal channel (12) extending from the transverse channel (11) rearwards and whose rear end continues into a raised rear zone (4) of the seat pan (1).

8. A seat part for a vehicle seat, comprising:
   a deep-drawn sheet metal pan comprising a middle zone, one or more side walls extending from said middle zone and projecting upwards, a raised rear zone and a front zone inclining forwards;
   a transverse channel joining said middle zone and said rear zone;
   a first longitudinal channel extending through said middle zone from said transverse channel to a flat portion extending over said front zone;
   a second and a third longitudinal channel each extending from said transverse channel part way through said rear zone, said second and third longitudinal channel being laterally offset from each other and from said first longitudinal channel such that said transverse channel transitions into said first, second and third longitudinal channels.

9. The seat part of claim 8 further comprising a cable assembly having a plurality of individual cables, and wherein at least one of said individual cables is laid in each of said transverse and longitudinal channels.

* * * * *